Feb. 1, 1966   A. J. MANGENG ETAL   3,232,168
APPARATUS FOR PRODUCING HOLES IN THE GROUND
Filed Oct. 2, 1963   6 Sheets-Sheet 6
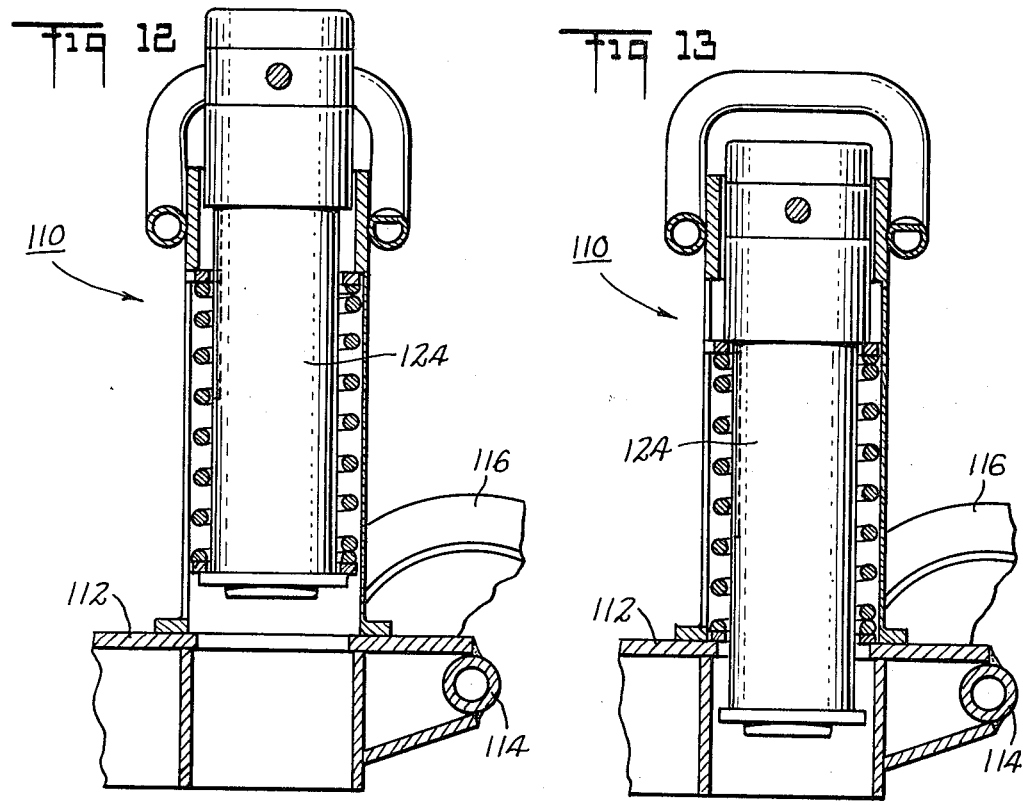
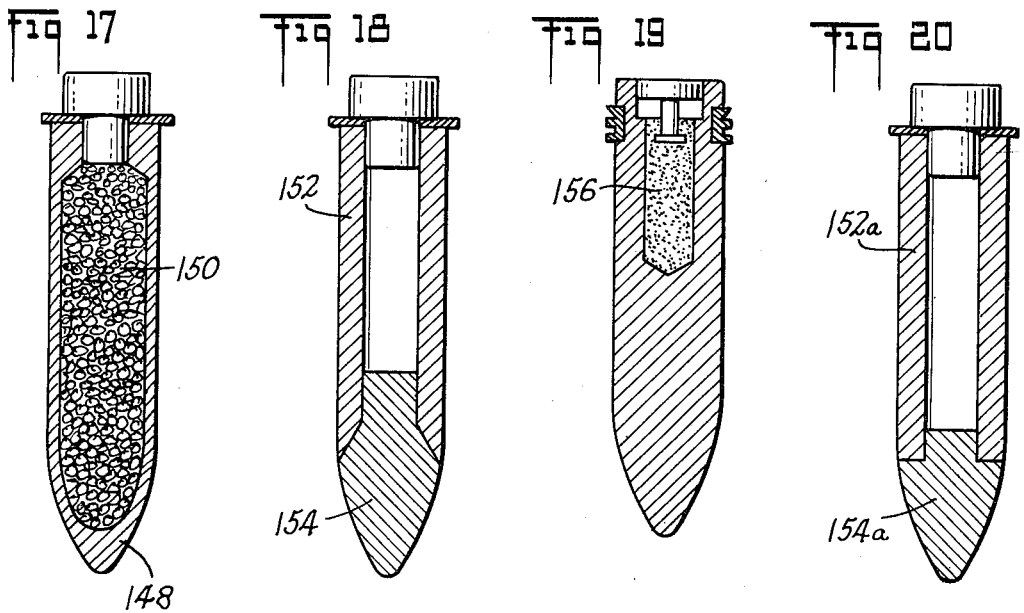

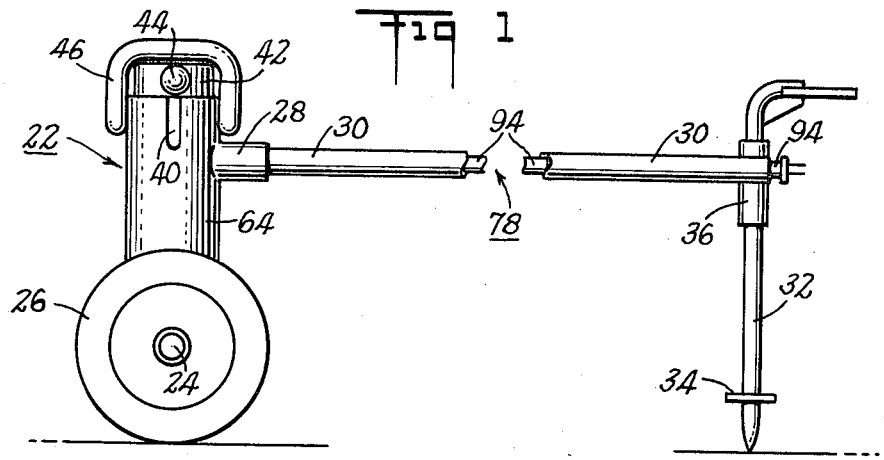
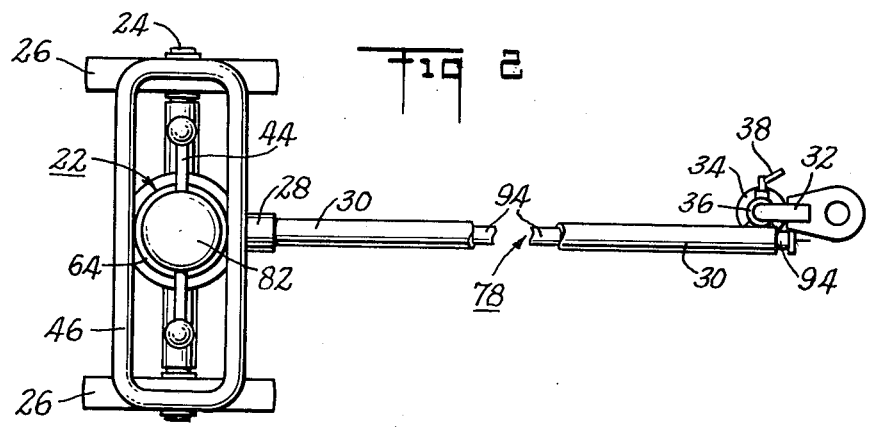
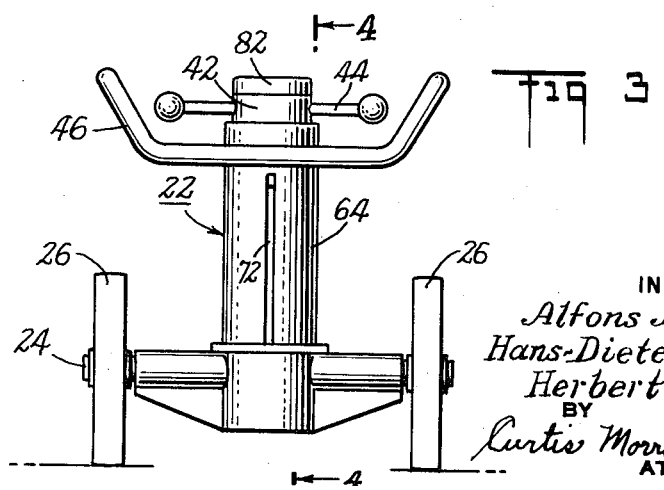

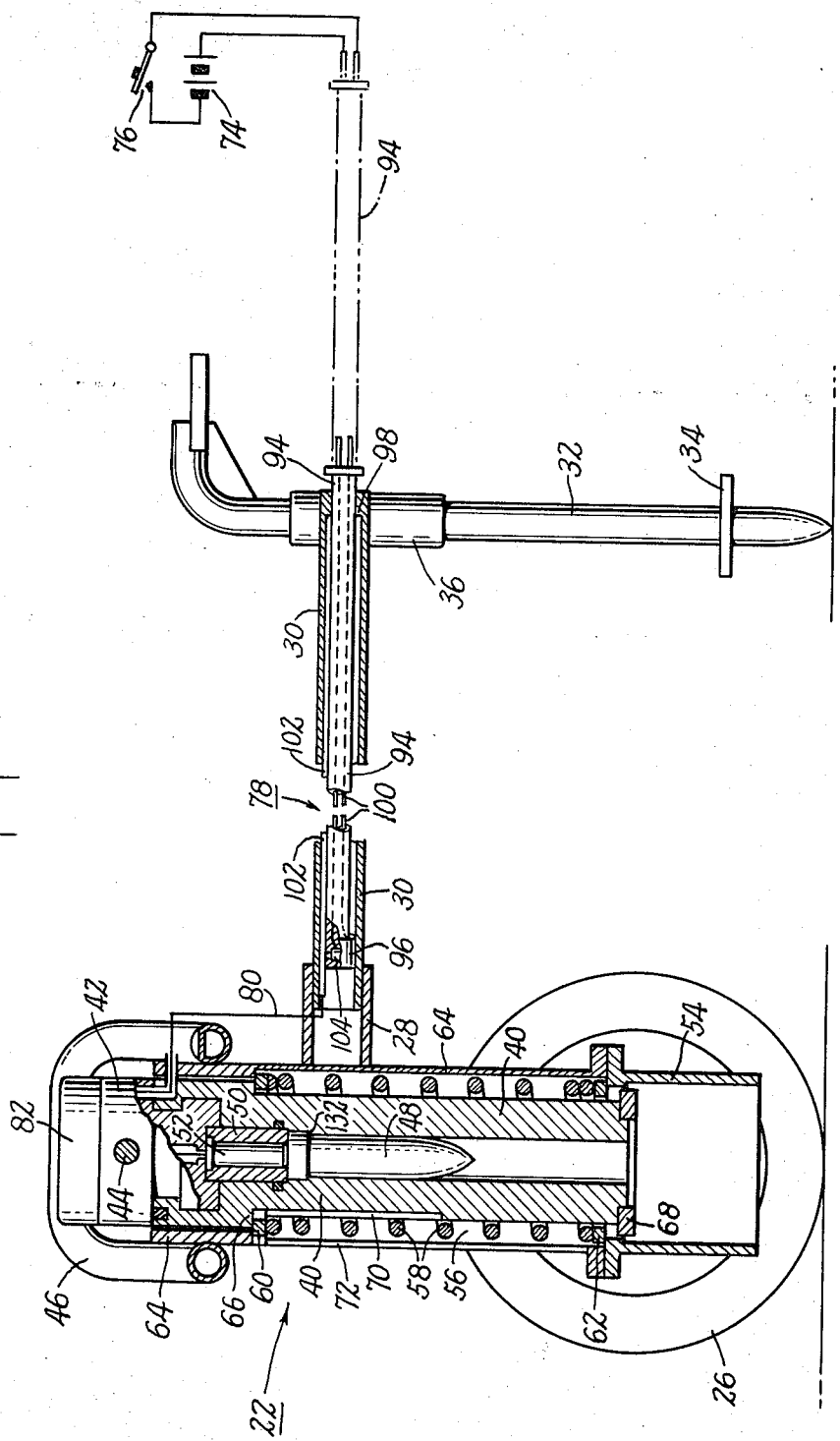

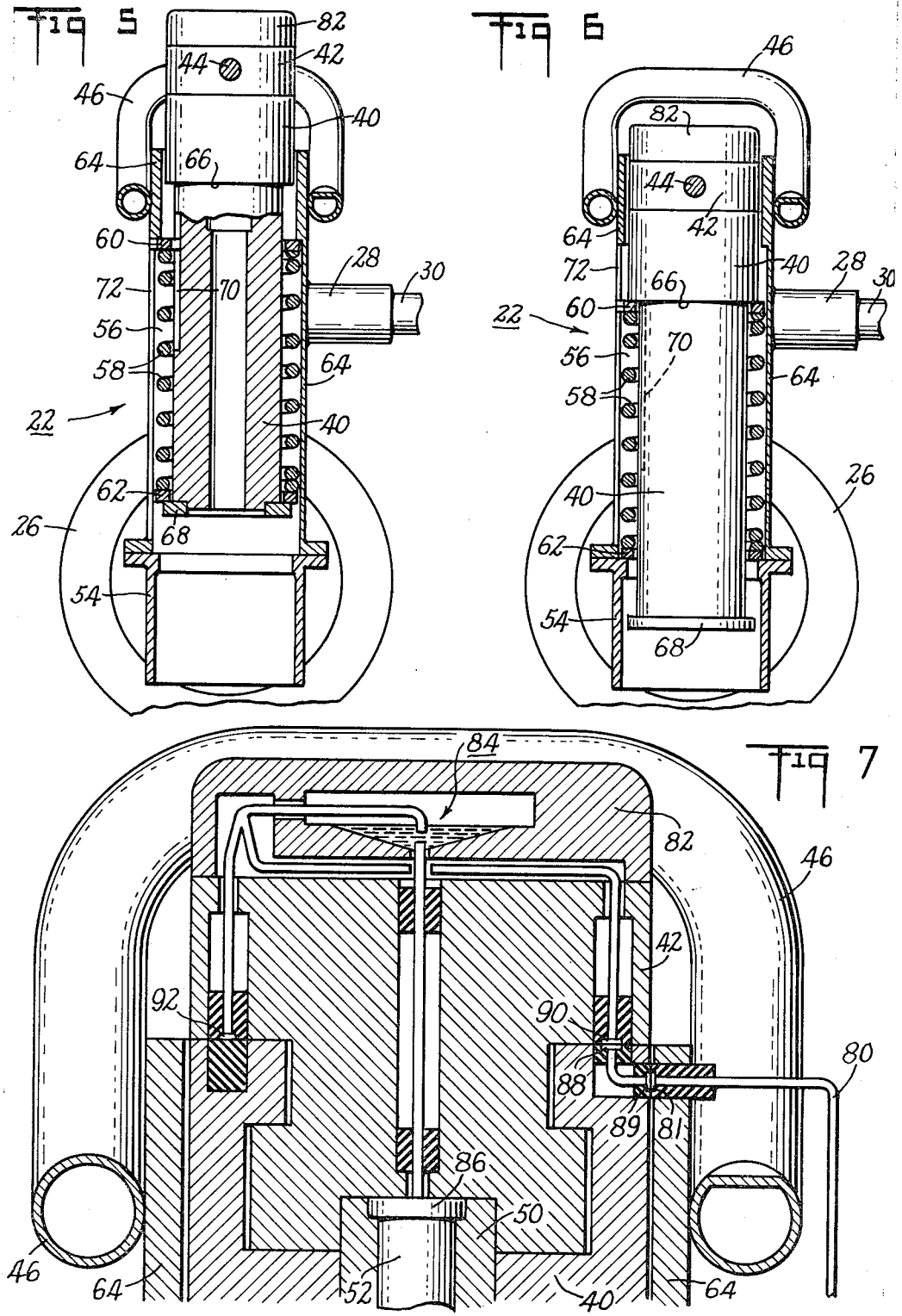

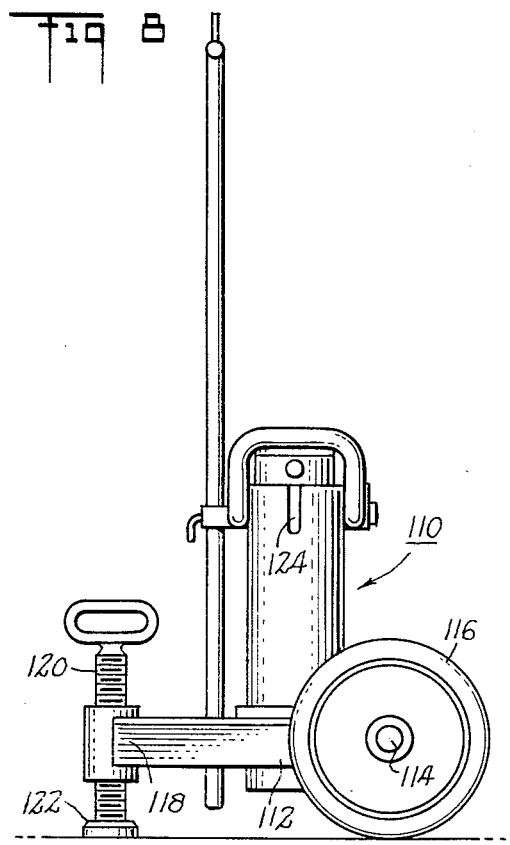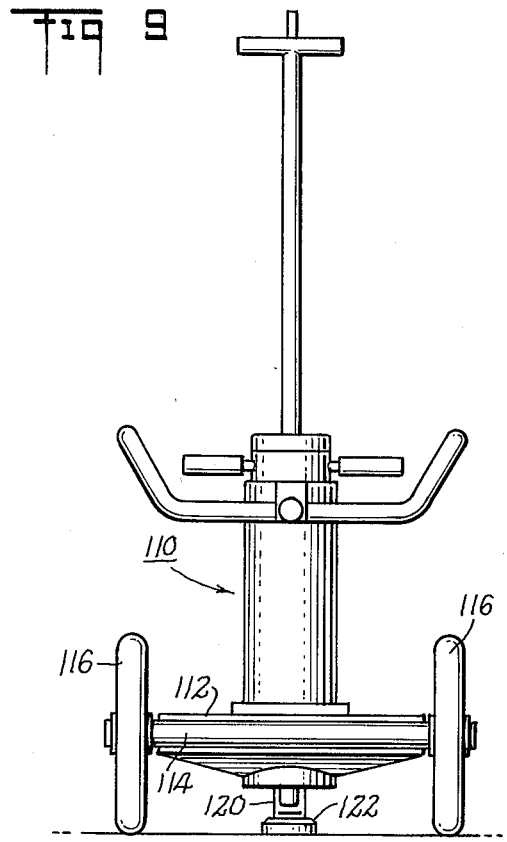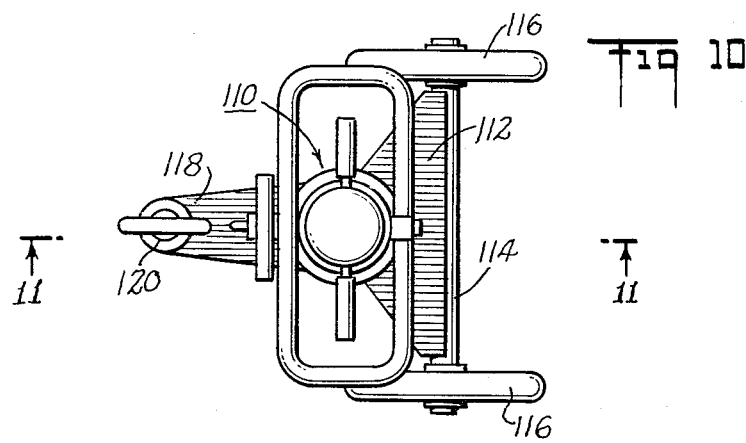

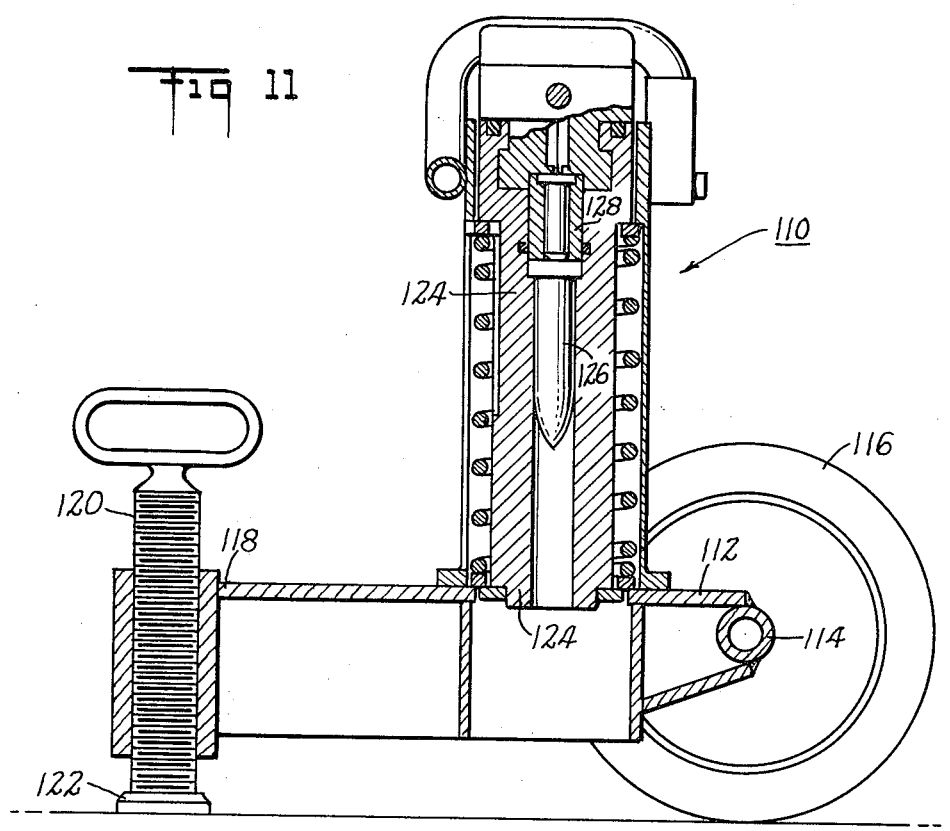
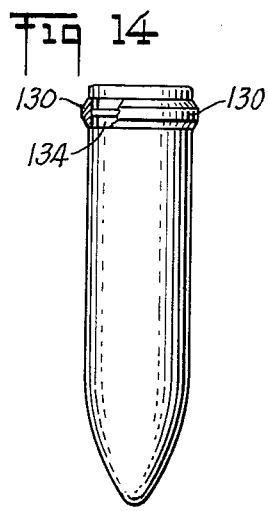
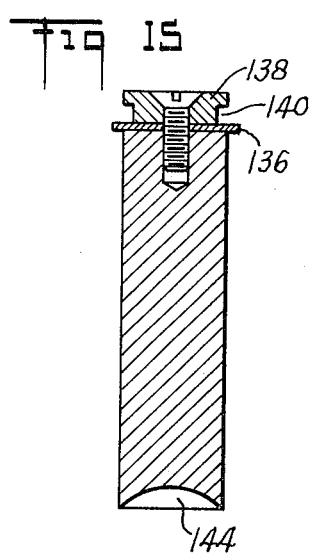
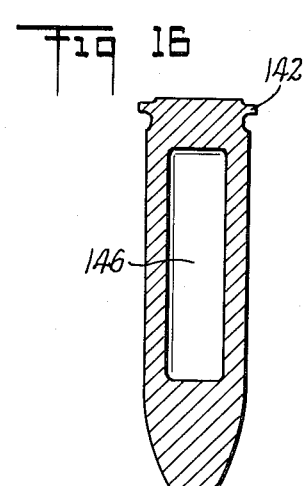

United States Patent Office 3,232,168
Patented Feb. 1, 1966

3,232,168
APPARATUS FOR PRODUCING HOLES
IN THE GROUND
Alfons J. Mangeng, Schaan, and Hans-Dieter Séghezzi, Vaduz, Liechtenstein, and Herbert Rangger, Nenzing, Austria, assignors to Anstalt fur Montage-Technik, Vaduz, Liechtenstein
Filed Oct. 2, 1963, Ser. No. 313,364
Claims priority, application Germany, Jan. 9, 1963, A 42,050
1 Claim. (Cl. 89—1)

This invention relates to methods and apparatus for producing holes, specifically cylindrical recesses, in earth of various types such as compacted or piled sand, loam, clay or humus, as well as in frozen earth and ice. The formation of such holes is useful for many purposes, for example to accommodate the insertion of piles, masts and pipes, for purposes of constructing roads, avalanche protection structures, etc., and for opening up water veins or the like.

A variety of devices and techniques have been proposed heretofore for producing holes in the ground, such as by mechanical drilling or by ramming. However, the prior proposals have not been fully satisfactory, and particularly have required considerable expenditure for complicated apparatus and also for operating power.

In an embodiment of the invention to be described in detail hereinbelow, there is provided a mobile carriage supporting a projectile guide tube in the form of a breech-closed barrel which is arranged to direct a cartridge-propelled projectile at high speed into the earth's surface so as to form the desired hole. The barrel is pointed directly downwards, i.e. perpendicular to the earth's surface, thereby assuring good penetration and minimizing the chance that the projectile will ricochet obliquely if it strikes hard and resistant material. The barrel is supported on the ground at three separated points to provide a stable platform for the precise directing of the projectile in a vertically downward direction. The barrel is mounted for axial movement to accommodate recoil, and is provided with a special recoil-absorbing mechanism. Unique safety devices also are provided to assure that no injury will occur to the operator during use of the apparatus.

Accordingly, it is an object of this invention to provide improved means and methods for producing holes in the ground. A specific object of this invention is to provide such apparatus which is economical in construction, reliable in performance, and safe to operate. Still another object is to provide such apparatus which can produce a large number of holes in a short period of time. Other objects, aspects and advantages of this invention will be pointed out in, or apparent from, the following description considered together with the accompanying drawings, in which:

FIGURE 1 is an elevation of apparatus in accordance with the present invention;

FIGURE 2 is a plan view of the apparatus shown in FIGURE 1;

FIGURE 3 is an end view of the apparatus shown in FIGURE 1;

FIGURE 4 is a cross section, on an enlarged scale, taken along line 4—4 of FIGURE 3, the barrel of the device being at its normal position;

FIGURE 5 is a cross section similar to FIGURE 4 but showing the barrel in a position higher than normal;

FIGURE 6 is a cross section similar to FIGURE 4, but showing the barrel in a position lower than normal;

FIGURE 7 is a detail cross section on an enlarged scale showing the firing circuit at the breech end of the barrel;

FIGURE 8 is a side elevational view of a modified apparatus for producing holes in the ground;

FIGURE 9 is a front elevational view of the apparatus shown in FIGURE 8;

FIGURE 10 is a plan view of the apparatus shown in FIGURE 8;

FIGURE 11 is a cross section, on an enlarged scale, taken along line 11—11 of FIGURE 10;

FIGURE 12 is a section similar to FIGURE 11 but showing the barrel in an upper position;

FIGURE 13 is a view like FIGURE 11 but showing the barrel in a lower position;

FIGURES 14 through 20 show, partly in section, various types of projectiles.

Referring now to FIGURES 1–3, there is shown hole-forming apparatus comprising a housing 22 mounted on the axle 24 of a carriage having a pair of wheels 26. Secured to an extension 28 of the housing is a traction pole 30, the remote end of which is adapted to be supported by a vertical support mandrel 32. The lower end of this mandrel is sharply pointed so as to grip the ground, and a stop plate 34 is provided to limit the depth of insertion into the ground. When the carriage is to be transported from place to place, the support mandrel 32 is shifted upwardly within the sleeve 36 secured to the traction pole 30 and is held in this position by operating a locking lever 38. In this condition, the traction pole 30 can be fastened to a truck or the like to permit the carriage to be pulled as desired.

Referring now also to FIGURE 4, the housing 22 contains a vertical barrel 40 having at its upper end a breech-block 42 which is locked thereto by means of a conventional bayonet closure. A handle 44 is provided, within a protective lifting frame 46, to permit this block to be rotated to its disengaged position for removal upwardly to accommodate the insertion of a projectile 48. An upper casing 50 is arranged to receive a cartridge 52 which when fired propels the projectile downwardly into the ground to form the desired hole.

It has been found that the muzzle end of the barrel 40 should, at the time of firing, be spaced from the earth a distance of approximately one to two times the length of the projectile 48. Extending below the muzzle of the barrel, and secured to the housing 22, is a cylindrical shield 54 which serves to intercept parts of the earth which fly upwardly and laterally away from the point of projectile impingement, thereby preventing injury to the operator from such earth parts.

In accordance with a further aspect of the present invention, barrel 40 is mounted for vertical displacement in order to accommodate absorption of the recoil energy. For this purpose, in the annular space 56 is a compression spring 58 which is under initial compressive stress with a force equal to one to two times the weight of the barrel. This spring bears at its remote ends against respective upper and lower rings 60 and 62, which are longitudinally spaced the required distance to provide the desired initial compressive stress. In the normal or "rest" position of the barrel 40, as shown in FIGURE 4, the lower ring 62 is seated on an annular shoulder of the shield 54 while the other ring 60 is pressed upwards against an annular surface of the cylindrical shell 64 forming part of housing 22. Ring 60 supports the barrel 40 by engagement with an annular shoulder 66 thereof.

When the cartridge for the projectile 48 is fired, the recoil energy first forces the barrel 40 upwards within the cylindrical shell 64. After a short distance of free recoil, i.e. without any damping or spring resistance, an annular part 68 at the muzzle end of the barrel strikes the lower ring 62 and the recoil energy from that point on is absorbed by further compression of the spring 58 as the ring 62 is lifted up from the shoulder of shield 54. Part 68 does not strike ring 62 until after the projectile leaves the barrel, thereby assuring that the projectile is not deflected by any unbalanced lateral forces.

After storage of the recoil energy in the compression of spring 58, this spring expands and accelerates the barrel 40 downwards. During this movement, the lower ring 62 reseats against the annular shoulder of shield 54, and the barrel continues on down to recompress the spring 58 by forcing the upper ring 60 down from the annular surface of shell 64. Thus, the spring again takes up the kinetic energy of the barrel as indicated in FIGURE 6. By continuing this reciprocating motion of the barrel between two limiting positions, the compression spring 58 is alternately compressed and relaxed in a damped oscillation until the barrel comes to rest.

In order to assure that the motion of the barrel 40 is limited to axial movement without rotation, the ring 60 is provided with inwardly and outwardly extending projections which respectively engage a groove 70 in the barrel and a slot 72 in the shell 64. Thus, the barrel is effectively keyed to the shell.

The cartridge is fired electrically by a current which may, for example, be derived from a battery 74 connected to a firing switch 76. The battery current is directed through connection means 78 in the traction pole 30, and passes on a lead 80 through the shell 64, the barrel 40 and the breech-block 42. In accordance with further aspects of the present invention, there are provided special safety means to assure that this firing cannot take place except under proper conditions, as described hereinafter.

In more details, and referring now to FIGURE 7, screwed to the breech-block 42 is a plastic cap 82 the interior of which is provided with a mercury "tilt switch" 84. As illustrated, the firing lead 80 passes around the cap 82 and extends down into the top surface of the pool of mercury within the cap. The electrical connection is completed from the bottom of this pool of mercury down to the firing terminal 86 of the cartridge. If the barrel 40 is tilted at too great an angle with respect to vertical, the electrical connection through the mercury switch 84 is interrupted so that no firing is possible. Thus the projectile 48 cannot be driven at any substantial oblique angle into the ground and thereby cause injury by ricochet effects, etc.

As an additional safeguard, the breech-block 42 is so arranged that the firing circuit can be completed only when the bayonet lock therefor is properly secured. For this purpose, the firing circuit passes through a contact 88 in the barrel 40 and a contact 90 in the breech-block, these two contacts being so arranged that they are in engagement only when the breech-block has been properly secured in place. Since the breech-block can be locked to the barrel in two positions which are 180° apart, an additional contact 92 is provided on the opposite side of the block, adjacent an insulating element in the barrel.

A further safeguard is provided by arranging the firing circuit so that the firing current cannot pass to the cartridge 52 unless the barrel 40 is in its normal or "rest" position. For this purpose, the lead 80 is connected to a fixed terminal 81 in the housing, and the circuit is completed by a contact 89 carried by the barrel. Thus, if the barrel is displaced axially, the firing circuit is interrupted.

Reverting to FIGURE 4, in carrying out the firing procedure, the operator must pull out from the traction pole 30 an insulating tube 94 until a collar 96 at the end thereof engages a shoulder 98. This engagement completes the battery ground return circuit from lead 100 through a contact on collar 96 to the metal frame of the apparatus at 98, this apparatus providing electrical continuity to the casing of the cartridge. The connection means 78 provides a continuous electrical path from battery 74 to lead 80, this path passing through an elongated connector 102 and sliding contact 104 which engages connector 102 regardless of the positioning of tube 94 within traction pole 30. Since the ground return is not completed until tube 94 is fully withdrawn, i.e. a distance approximately equal to the length of the traction pole 30 (typically about 2 meters), the operator will be a safe distance of about 4 meters from the cartridge when the firing takes place.

Referring now to FIGURES 8–10, there is shown an apparatus which is generally like that of FIGURE 1, and includes a housing 110 carried on a chassis 112 which is, in turn, mounted on an axle 114 having rubber-tired wheels 116 at its ends. A chassis extension 118 carries a threaded receptacle for a vertically-adjustable support 120 having an enlarged foot 122 resting against the ground. Referring also to FIGURES 11–13, the housing 110 contains a vertical barrel 124 which is spring-supported for axial movement to absorb the recoil energy when the projectile 126 is fired. Since the general mode of operation of this barrel support, as well as of the firing circuitry for the projectile, already has been set forth in the description of the FIGURE 1 embodiment, no detailed discussion of these aspects of the FIGURE 8 embodiment are given herein.

An important feature of the FIGURE 8 embodiment is that the center-of-gravity of the entire apparatus lies on the longitudinal central axis of the barrel 124. Preferably, this center-of-gravity is below the cartridge casing 128 for the projectile 126, and advantageously the center-of-gravity is in the lower one-third of the barrel, i.e. in the region of the muzzle. In accordance with a still further aspect of the invention, the center points at which the foot 122 and the two tires 116 make contact with the ground form the apices of an equilateral triangle, to provide good support for the projectile firing.

By placing the center-of-gravity on the barrel axis, or effectively so, the forces resulting from firing the cartridge do not tend to tip the barrel from the vertical, so that the projectile is driven precisely in the desired direction into the ground. Stability also is enhanced by the vertical location of the center-of-gravity beneath the cartridge case, since the upwardly directed recoil forces thus are applied to the apparatus at a point above the center-of-gravity. By these means, there is a significant reduction in the need for an elongated traction pole for support as shown in FIGURES 1–3.

Referring now to FIGURE 14, in order to prevent the projectile from falling out of the barrel prior to ignition of the cartridge, the head of the projectile is provided with a deformable extension in the form of an annular plastic part 130, and by means of which the projectile rests against a stop 132 (FIGURE 4) within the barrel. When the projectile is propelled through the barrel, part 130 is forced into annular groove means 134 provided at the head end of the projectile.

As also shown in FIGURE 15, the projectile is for certain applications provided with a blunt striking end 144, i.e. non-pointed, and advantageously this end can be concave as illustrated. Such a construction tends to prevent the projectile from bouncing back from a solid obstacle, and, instead, tends merely to cause the projectile to be deflected laterally with the result that the kinetic energy of the projectile is absorbed by the obstacle. In this regard, an asymmetric configuration of the tip can be utilized to produce a curved path of movement through the earth.

A further arrangement for minimizing rebound is shown in FIGURE 16 wherein the projectile is formed with a hollow inner space 146. By these means, the projectile will tend to be destroyed upon striking a hard obstacle such as stone or rock. Thus the projectile will not bounce back to injure the operator.

In one projectile embodiment found to be satisfactory for the intended purposes, the mass of the projectile was proportioned to the mass of the firing apparatus (including the housing, carriage and barrel, etc.) in the ratio of 1:70. Moreover, the weight of the projectile (in grams)

preferably is proportioned to its diameter (in millimeters) in a ratio of from 20:1 to 40:1. As a specific example, the projectile can weigh 800 to 1100 grams for a diameter of about 34 mm. The length of the projectile preferably is related to its diameter in the ratio of 4:1 to 6:1.

In the projectile shown in FIGURE 17, the impact-extruded shell 148 contains a lumpy granular filling 150, e.g. lead shot, sand or sawdust. Such a filling tends to minimize rebound danger because the shell, upon striking a rock, will burst, and the energy can be dissipated by the flow of the filling out of the shell.

FIGURE 18 shows a projectile comprising two separate parts 152 and 154 which are fitted together with mating surfaces disposed at an oblique angle with respect to the projectile axis. When such a projectile strikes a hard object, the sleeve-shaped upper part 152 tends to slide down around the heavy nose part 154, and the deformation of the two parts serves to absorb much of the kinetic energy so as to minimize rebound. FIGURE 20 is similar to FIGURE 18, but the mating surfaces between parts 152a and 154a are at right angles to the projectile axis.

FIGURE 19 shows a projectile wherein the propellant charge is placed in a recess 156 in the projectile. This avoids the need for a separate cartridge sleeve for carrying the cartridge as in the FIGURE 4 construction.

We claim:

Apparatus for forming substantially cylindrical holes in the ground comprising a carriage having a centrally positioned housing, an axle projecting from each side of the housing, a wheel on each axle, a traction pole projection from the housing at right angles to the axles, a supporting leg mounted on the traction pole adjacent its free end which, together with the wheels, provide a supporting structure engaging the ground at three space points, a gun barrel mounted in said housing and having an axial bore substantially vertical so that said axial bore points toward the ground with its muzzle at the lower end in spaced relation to the ground, recoil mechanism between the gun barrel and housing, the center of gravity of the entire apparatus being located in the bore of the gun barrel, said leg depending from the traction pole being mounted for adjustment vertically to adjust the supporting structure to point the barrel at right angles to the ground, a breech block for closing the upper end of the gun barrel, said barrel being adapted to receive an elongated projectile and explosive charge, and an electric firing circuit including a manually operable control switch at the end of the traction pole remote from the housing and safety switches to prevent firing until the barrel is substantially vertical and the breech block is in place.

References Cited by the Examiner

UNITED STATES PATENTS

| | | | |
|---|---|---|---|
| 891,778 | 6/1908 | Mertens | 89—44 |
| 1,141,783 | 6/1915 | Dobregansky | 102—92.5 |
| 1,243,857 | 10/1917 | Muenzenmaier | 102—92.5 |
| 1,585,664 | 5/1926 | Gilman | 89—1 |
| 1,661,091 | 2/1928 | Riabouchinski | 89—1.7 |
| 2,328,247 | 8/1943 | Alexander | 89—1 |
| 2,379,991 | 7/1945 | Riboud | 89—40 |
| 2,466,929 | 4/1949 | Catlin et al. | 89—28 X |
| 2,770,736 | 11/1956 | Kransow | 102—92.5 X |
| 2,823,367 | 2/1958 | Huron | 200—61.47 X |
| 2,898,812 | 8/1959 | Meyer | 89—135 |
| 2,922,366 | 1/1960 | Lyon | 102—92.5 X |
| 2,996,012 | 8/1961 | Butler | 102—93 |
| 3,005,202 | 10/1961 | Kvavle | 89—1 |

BENJAMIN A. BORCHELT, *Primary Examiner.*

SAMUEL W. ENGLE, *Examiner.*